UNITED STATES PATENT OFFICE.

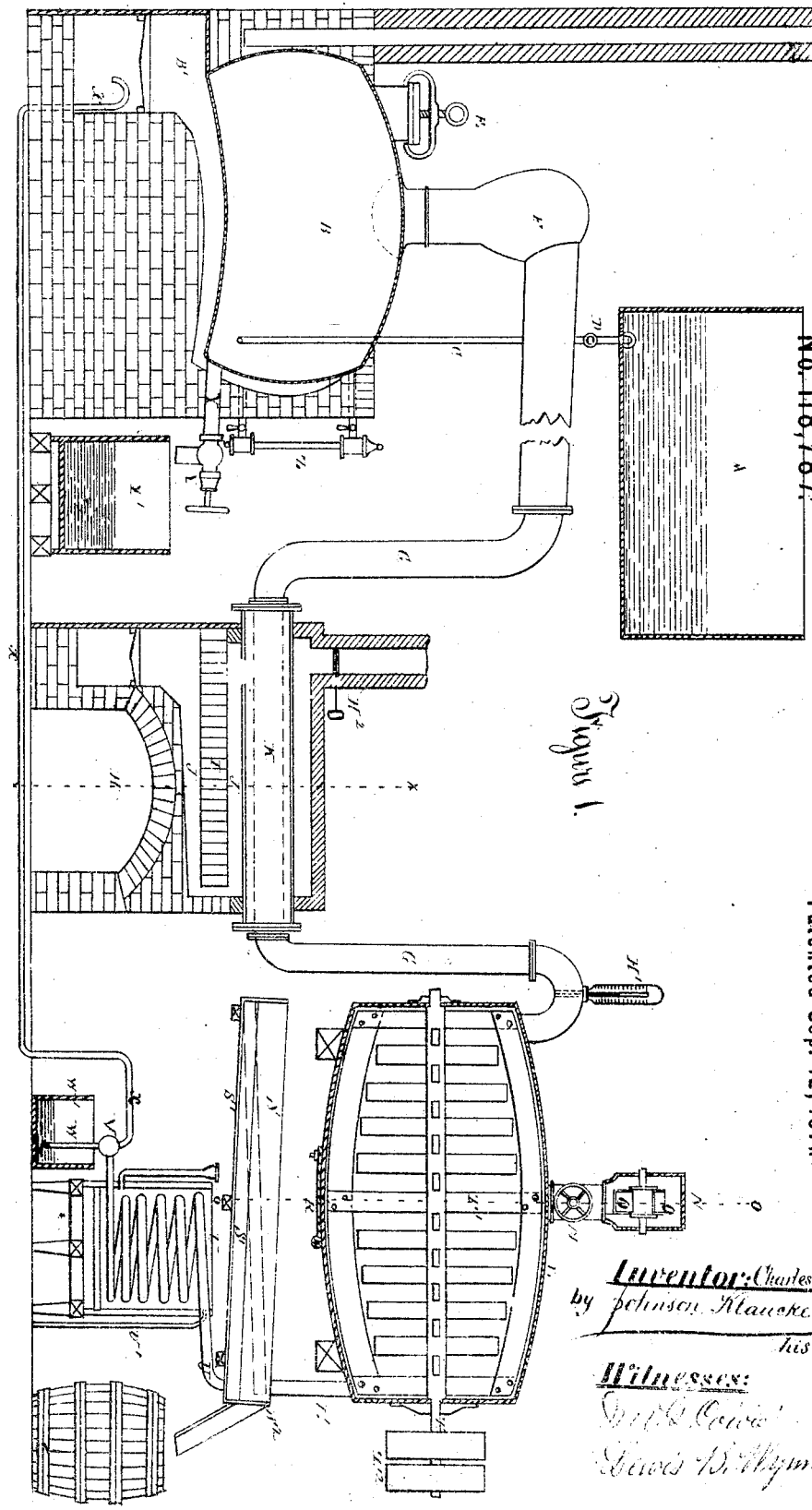

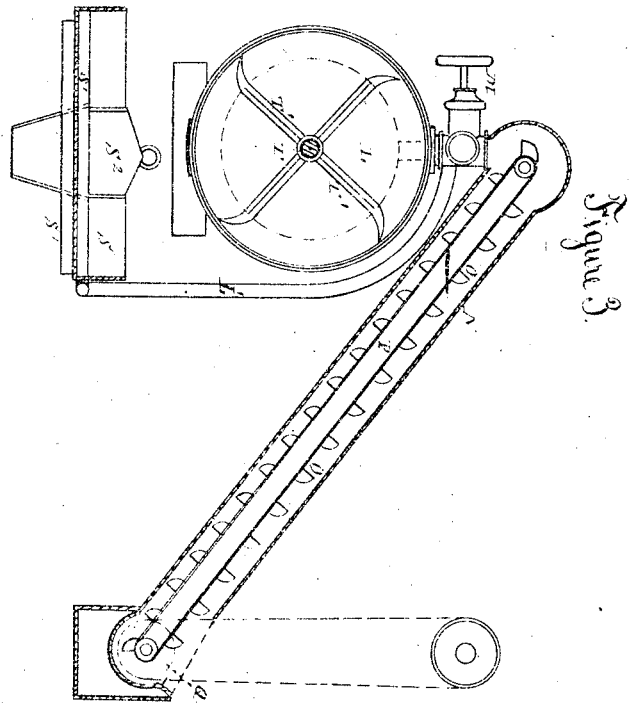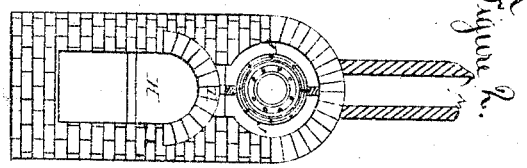

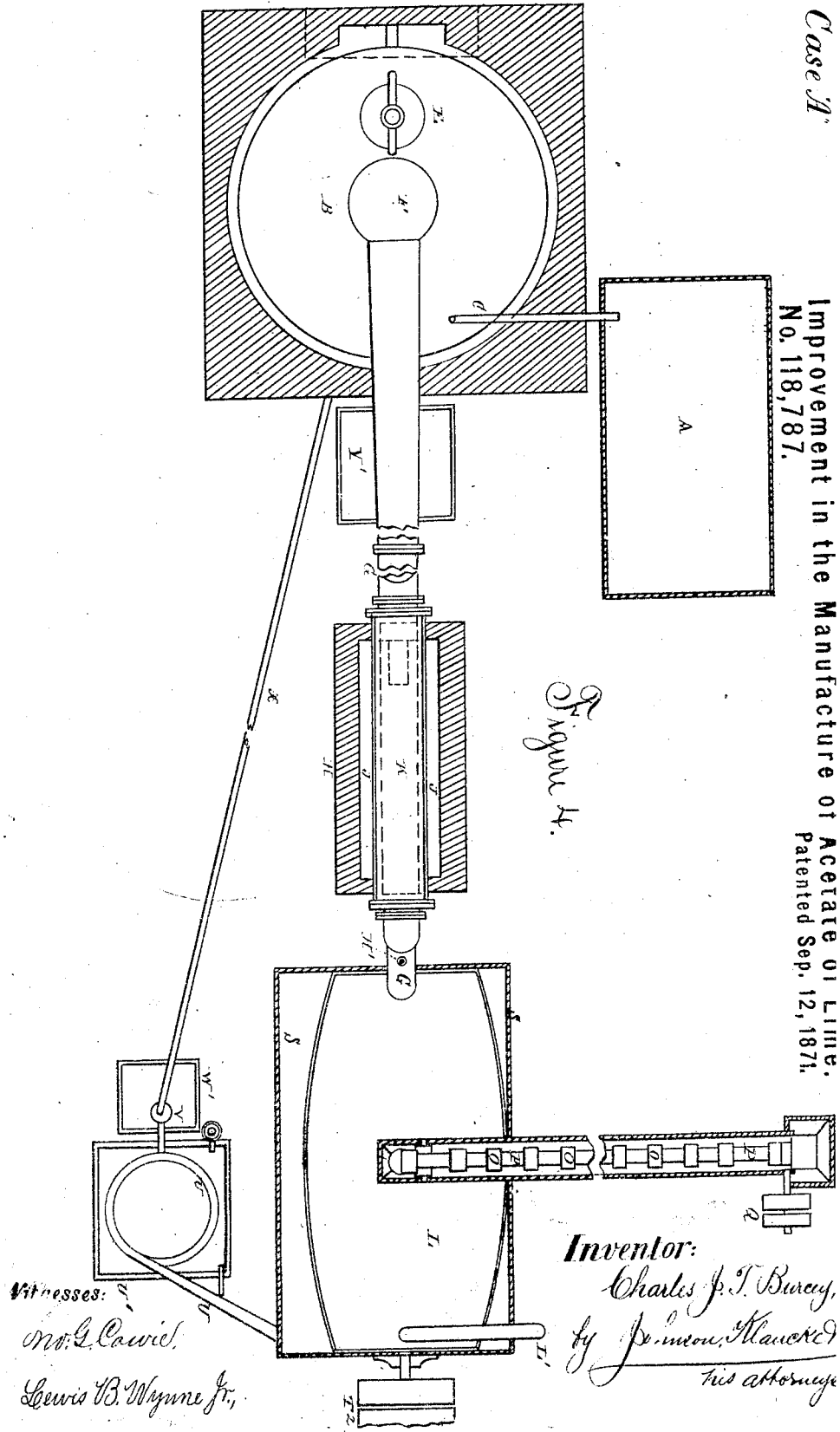

CHARLES J. T. BURCEY, OF BLACK ROCK, CONNECTICUT.

IMPROVEMENT IN THE MANUFACTURE OF ACETATE OF LIME.

Specification forming part of Letters Patent No. 118,787, dated September 12, 1871.

*To all whom it may concern:*

Be it known that I, CHARLES J. T. BURCEY, of Black Rock, in the county of Fairfield and State of Connecticut, have invented a new and useful Improvement in the Manufacture of Acetate of Lime from Pyroligneous Acid, and in apparatus therefor, of which the following is a specification:

In the accompanying drawing, Figure 1, Sheet 1, represents a sectional elevation of my improved apparatus used in carrying out my new process. Figs. 2 and 3, Sheet 2, are sectional views of detached parts of the same at the lines *x x* and *o o* of Fig. 1. Fig. 4, Sheet 3, is a view of the parts shown in Fig. 1, partly in section and partly in plan.

Pyroligneous acid is allowed to flow from its reservoir A, situated at any suitable distance from a retort-boiler, B, through a pipe, C, the flow being regulated by means of a stop-cock, D. The retort-boiler B is suitably bricked in a furnace, and may be heated by fire from a fire-place, B', as may be most advantageous. It is provided with a manhole, E, and a pipe, F G. H is a superheating-furnace, provided with an arched bottom, I, so as to form a return-flue, J, by means of which the heat, but not the flame, is allowed to play around a jacket or case, K, which incloses the pipe G, which latter, passing out from the superheating-furnace, is suitably connected to the agitating-vat L. In Fig. 1 this vat is shown in longitudinal vertical section, while in Fig. 3 it is shown in vertical cross-section. This agitating-vat L is provided on its upper side with a pipe, M, into which passes the mouth of a conveyer, N, in such a manner that buckets O on an endless belt, P, which passes over rollers at the upper and lower end inside of the conveyer, will empty their contents through the pipe M into the vat L as they pass around the upper roller. The lower end of the conveyer lies in a trough or receptacle, from which it takes the slaked lime and conveys it to the agitating-vat. Motion may be imparted to the endless belt and lower roller from a pulley, Q, by steam or any other suitable means. Through the center of the vat L runs lengthwise a shaft, T, resting in suitable bearings in the ends of said vat, and carrying an agitator-frame, T¹, of suitable construction, to which shaft motion may be imparted through a pulley, T², by steam or any other suitable means. At the bottom of the agitating-vat L, directly below the pipe M, is a trap-door, R, through which the acetate of lime in the agitating-vat may be emptied into a double-bottomed pan, S, the double bottom forming a space, S', which latter connects at one end with the upper side of the interior of the agitating-vat L by means of a tube, L'. At one end of the pan S is a door, S², through which the dried acetate of lime in the pan may be emptied into a barrel or any other suitable receptacle. The space S¹ connects at one end with a worm-pipe, U, in a condenser, U'. The lower end of this worm-pipe U ends in a bulb, V, from which extends downwardly a pipe, W, into a reservoir, W', while another pipe, *x*, extends from its upper part and passes in any suitable manner back to the fire-place L' under the grate. The condenser U' is suitably provided with pipes for effecting a constant stream of water over the condensing-pipes. From one end of the lower part of the still or retort B extends a pipe, Y, provided with a stop-cock, through which the residuum in the retort may be drawn off into a reservoir Y'. Z is a gauge to show the height of fluids in the retort.

The operation of my improved apparatus is as follows: The pyroligneous acid is heated in the retort or still B and the products of its evaporation pass through the pipe F G into the agitating-vat L, being superheated on their way by passing through the superheating-furnace H. A thermometer, H¹, on the pipe G, near where it connects with vat L, indicates the temperature of the superheated steam, so that by means of a damper, H², on the superheating-furnace, an even temperature from 150° to 200° can be kept up. Before admitting the steam into the agitating-vat the latter has received through the conveyer N a suitable quantity of dry slaked lime, which, by means of the agitator-frame T¹, which is rotated at a suitable speed, is thoroughly mixed with the superheated product of evaporation of the pyroligneous acid or superheated acid vapor, by means of which permeation the acid is absorbed by the lime until the latter is thoroughly saturated with it, while the empyreumaticated steam escapes through the tube L' into the space S¹ under pan S, and from there passes into the condenser U', where it is condensed, the fluid passing into the reservoir W' through pipe W, while the gaseous matters freed in the condensation, and of which there is a large percentage, pass through the pipe X into the fire-place B', where they assist in the combustion and greatly lessen the quantity of fuel otherwise needed. While the empyreumaticated vapor is thus escaping from the agitating-vat the lime has been thoroughly permeated with the acid and is allowed to fall into the pan S through the trap-door R, where the acetate of lime, which is the product of this operation, dries, the pan being heated by utilizing the hot current of empyreumaticated vapor passing under it through space $S^1$. From the pan S the dried acetate of lime may be removed by opening the door $S^2$ and dropping it into barrels or other suitable receptacles.

My improved process of manufacturing acetate of lime does not require the acetate to be separated from the base by dissolving in water and evaporating, after the base has been thoroughly permeated with pyroligneous-acid vapors. Nor is there any loss of such pyroligneous acid, as all its particles are utilized, the fluid from the reservoir W' containing considerable alcohol, &c., which, by proper distillation, may be easily separated. By my process I am enabled to produce perfect acetate of lime at one operation.

Having described my invention, I claim—

1. In the manufacture of acetate of lime at one operation, the vapors of pyroligneous acid and slaked lime, or their equivalents, introduced into direct contact with each other while in a state of commotion, essentially as described.

2. In the manufacture of acetate of lime, the charging of slaked lime with pyroligneous-acid vapors in an agitator, substantially as described.

3. In the manufacture of acetate of lime, the process of condensing the empyreumaticated vapors formed in the production of the acetate of lime, to utilize its fluid and gaseous matter, substantially as described.

4. In combination with the pipe for conducting the pyroligneous acid from the still, the inclosing-case or cylinder K for said pipe, to render the heat uniform and to protect the conveying-pipe, as described.

5. In combination with a boiler for evaporizing pyroligneous acid and a superheating-furnace, an agitator, L T $T^1$, substantially as described.

6. In combination with the agitator, a feeding-conveyer, N, substantially as described.

7. In combination with the agitator, the double-bottomed pan S, substantially as described.

8. In combination with the agitator and pan S, the space $S^1$, pipe L', condenser U U', reservoir W', and pipes W x, substantially as described.

In testimony whereof I have hereunto set my hand to the above specification of my improvement in the manufacture of acetate of lime from pyroligneous acid, this 6th day of July, A. D. 1871, in the presence of two witnesses.

CHARLES J. T. BURCEY.

Witnesses:
A. E. H. JOHNSON,
J. W. HAMILTON JOHNSON.